United States Patent [19]

Erkfritz

[11] 3,716,900
[45] Feb. 20, 1973

[54] INDEXABLE CUTTING INSERT AND HOLDER THEREFOR

[75] Inventor: Donald S. Erkfritz, Rockford, Ill.

[73] Assignee: The Ingersoll Milling Machine Company, Rockford, Ill.

[22] Filed: Feb. 25, 1972

[21] Appl. No.: 229,436

Related U.S. Application Data

[62] Division of Ser. No. 67,949, Aug. 28, 1970.

[52] U.S. Cl. .............................................. 29/105 A
[51] Int. Cl. .............................................. B26d 1/12
[58] Field of Search .................. 29/105 R, 105 A, 96

[56] References Cited

UNITED STATES PATENTS 3,273,222  9/1966  Begle ............................. 29/105 A
3,315,332  4/1967  Lowry et al. .................... 29/105 A
3,217,384  11/1965  Wirfelt ........................... 29/105 A Primary Examiner—Harrison L. Hinson
Attorney—Wolfe, Hubbard, Leydig, Voit & Osann, Ltd.

[57] ABSTRACT

Rectangular blocks or inserts of cutting material having a center hole are secured by conically headed screws in peripheral pockets in the rotary body of a face milling cutter and are adapted for selective indexing about the screw axis into a plurality of cutting positions. One of the abutments defining each indexed position of the insert is itself mounted for indexing about its central axis and is locked in place by a conically headed screw which crowds the abutment against the cutter body.

3 Claims, 12 Drawing Figures

PATENTED FEB 20 1973
3,716,900
SHEET 1 OF 2
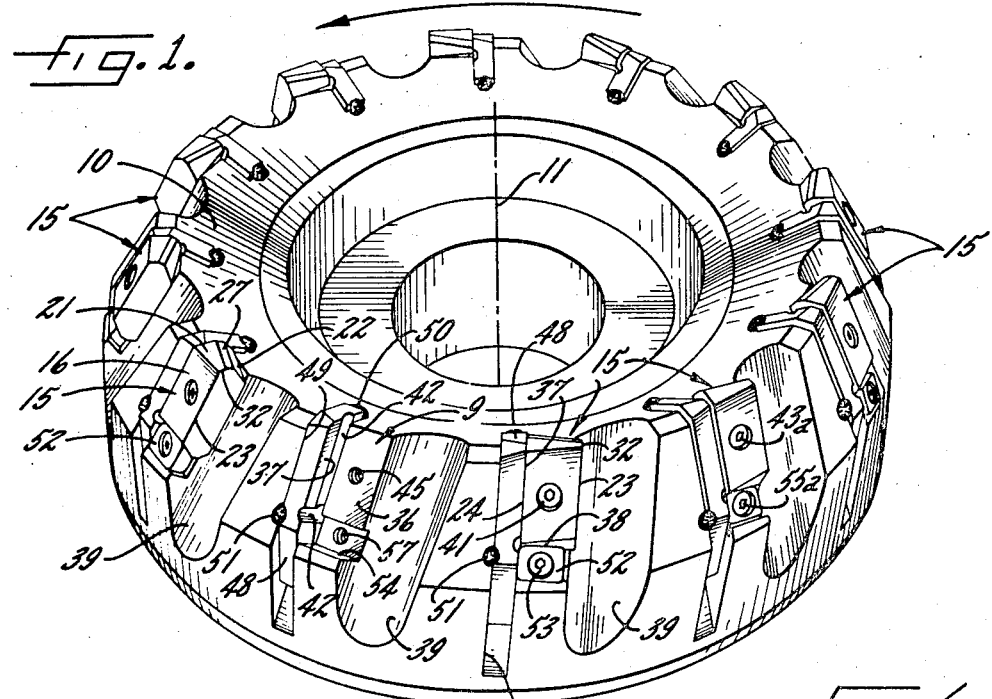
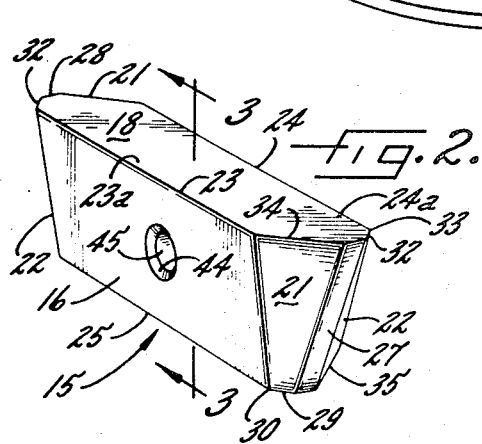
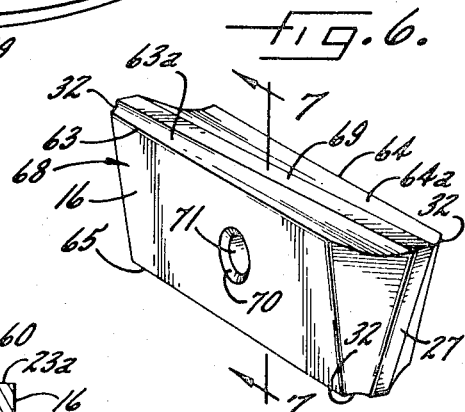
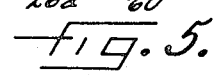
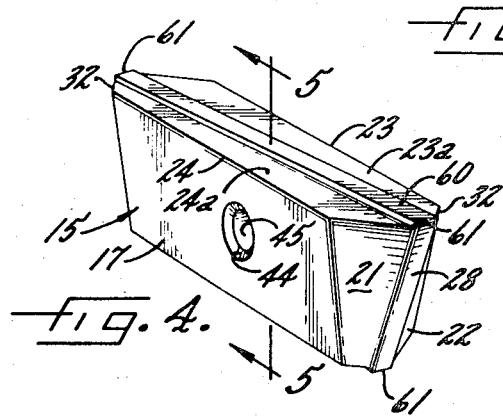
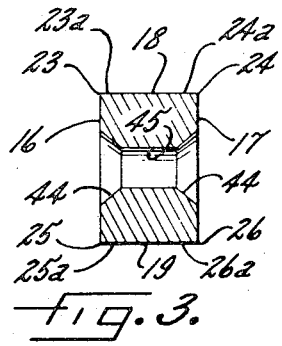

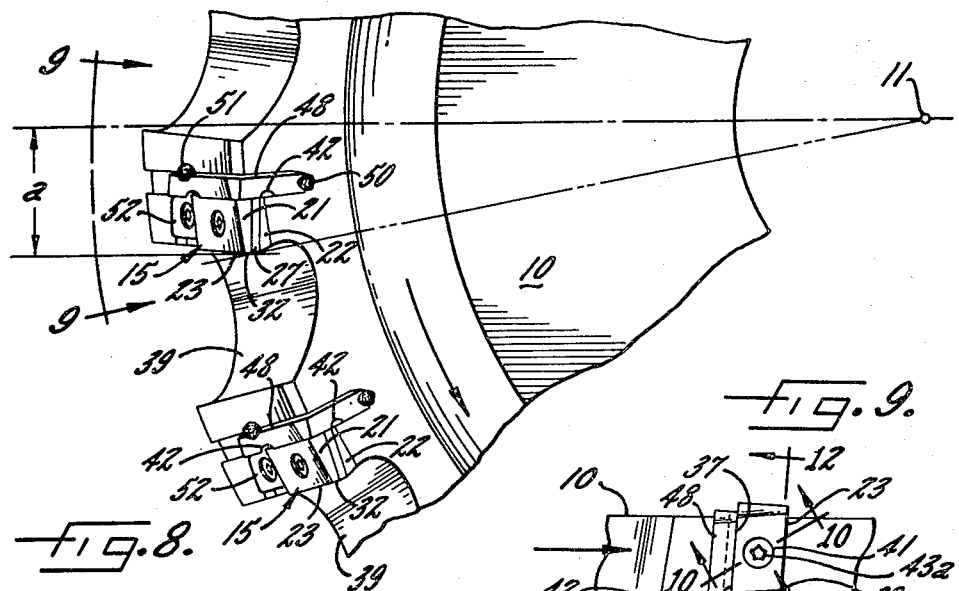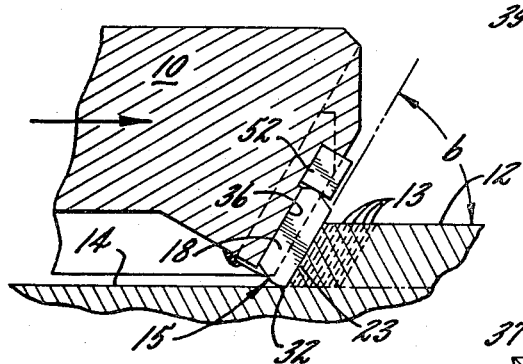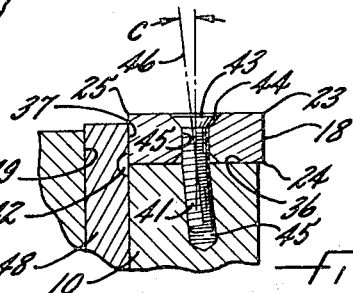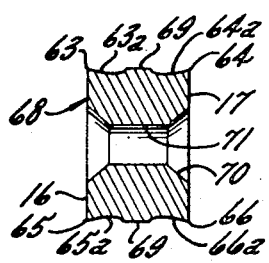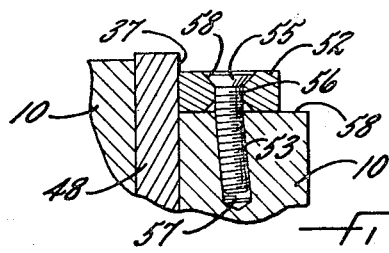

3,716,900

INDEXABLE CUTTING INSERT AND HOLDER THEREFOR

CROSS-REFERENCE TO A RELATED APPLICATION

This application is a division of my copending application Ser. No. 67,949, filed Aug. 28, 1970.

BACKGROUND OF THE INVENTION

This invention relates to cutter blades or inserts adapted to be clamped to and located edgewise on a supporting platform of a cutter body by means of a screw extending through an aperture in the insert and acting, during final tightening of the screw, to cam and press the insert edgewise against angularly related locating abutments upstanding from the inner edge of the platform. The invention has more particular reference to the abutments for locating the inserts in the cutter body.

SUMMARY OF THE INVENTION

In accordance with the present invention, one of the insert locating abutments of the cutter body is formed by one side of a block which is indexable about a central axis to present a new abutment in the same position after the locating abutment has been damaged in service use. More specifically, the block coacts with another locating abutment to define a corner into which the insert is pressed, and the block itself is adapted to be pressed edgewise against the cutter body by a conically headed screw which may be loosened to enable indexing of the block.

BRIEF DESCRIPTION OF THE DRAWINGS

FIG. 1 is a perspective view of a face milling cutter having indexable blades or inserts, one of the blades removed from its supporting pocket.

FIG. 2 is a perspective view of one of the cutter blades.

FIG. 3 is a section along the line 3—3 of FIG. 2.

FIG. 4 is a view similar to FIG. 2 after the blade shown in FIG. 2 has been sharpened but looking toward the opposite end of the blade.

FIG. 5 is a section along the line 5—5 of FIG. 4.

FIG. 6 is a view similar to FIG. 2 of a blade modified to act with positive rake angles.

FIG. 7 is a section along the line 7—7 of FIG. 6.

FIG. 8 is a fragmentary plan view of the cutter shown in FIG. 1.

FIG. 9 is a side view taken along the line 9—9 of FIG. 8.

FIGS. 10 and 11 are sections taken along the lines 10—10 and 11—11 of FIG. 9.

FIG. 12 is a fragmentary view of the cutter and a workpiece taken approximately along the line 12—12 of FIG. 9, the cutter having been inverted from the positions shown in FIGS. 8 and 9.

DESCRIPTION OF THE PREFERRED EMBODIMENT

While useable in a wide variety of cutters to provide a number of available cutting edges without resharpening, the indexable inserts, indicated generally by the numeral 15, are shown in the drawings secured in pockets 9 angularly spaced around the body 10 of a face milling cutter adapted to be secured to a spindle for rotation about a central axis 11 and adapted when rotated and fed edgewise as indicated by the arrows in FIGS. 1, 9 and 12, along a workpiece 12 to remove successive inclined layers 13 and leave a flat finished surface 14.

Each blade or insert is a flat generally rectangular block of suitable cutting material such as tungsten carbide having opposite parallel sides 16 and 17, and parallel longitudinal side edge faces 18 and 19 perpendicular to the sides in the form shown in FIGS. 1, 2, 8 and 9, and two differently inclined and preferably flat faces 21 and 22 at each end of the block. The intersections 23 and 24 of the sides 16 and 17 and the edge face 18 constitute two of the four available cutting edges, the adjacent areas 23a and 24a (FIG. 2) of the edge face 18 being the cutting faces for these cutting edges. Similarly, the intersections 25 and 26 of the edge face 19 with the sides 16 and 17 constitute the other two cutting edges whose cutting faces are formed by the adjacent areas 25a and 26a (FIG. 3) of the edge face 19. For each of the four available cutting edges 23 to 26, the adjacent area of one of the insert sides 16 and 17, by proper location of the insert pocket 9, provides the necessary clearance for the main and bevelly disposed active cutting edge.

The clearance faces 21 and 22 on each end of the insert are separated from each other by an abutment engaging surface or flat 27 or 28 which is disposed perpendicular to the plane of the insert and extends diagonally across the insert end so that the faces 21 and 22 are trapezoidal in shape. The shorter end 29 of the face 21 intersects the edge face 19 at a corner 30 and constitutes the finishing or clean-up edge for the main cutting edge 25. On the opposite side of the end flat 27, the shorter end 32 of the face 22 intersects the edge face 18 at a corner 33 and constitutes the clean-up edge for the main cutting edge 24. To provide the necessary clearance trailing the finishing edges 29 and 32, the surfaces 21 and 22 slope away from these edges so that the opposite ends 34 and 35 are wider than the clean-up edges and the clearance faces are of trapezoidal shape.

In the face milling cutter illustrated, the pockets 9 in which the inserts constructed as above described are supported by the flat bottoms 36 and upstanding side walls 37 and 38 of slots equally spaced around the cutter body 10 and each having a chip recess 39 disposed ahead of the platform on which the insert is supported. The walls 37 and 38 are flat and extend across the trailing edge and the inner end of the platform 36 and constitute abutments disposed at right angles to each other and the platform and defining a corner into which the insert is crowded edgewise across the platform in the tightening of a screw 41 which clamps the insert against the platform and the two abutments. In the clamped position, the flat 27 at the inner end of the insert engages the abutment 38 while the side edge 19 opposite the exposed cutting face 18 abuts the corner wall 37. The upper and trailing cutting edge 24 of the insert in the position shown in FIG. 1, is disposed above the outer edge of the wall 37 while the lower cutting edge 26 adjacent the platform 36 lies along a groove 42 (FIGS. 1, 8 and 9) in the wall and thus is out of contact with this wall in the final clamped position of the insert.

Preferably, edgewise crowding of the insert against the corner abutments is effected in the manner disclosed in my copending application Ser. No. 17,605, filed Mar. 9, 1970 and involves the use of the screw 41 threaded into an upright hole 45 at the center of the platform 36 and having a frusto-conical head 43 adapted to seat fully as shown in FIG. 10 in one of the complemental seats 44 formed in the insert at opposite ends of a center hole 45. The screw is tightened by a tool inserted in a socket 43a in the flat end of the head which is disposed somewhat below the surrounding side 16 or 17 of the insert when the head is fully seated as shown in FIG. 10.

The outer end of the axis 46 of the screw hole 45 in the cutter body is tilted at an angle $c$ (FIG. 10) of a few degrees toward the corner defined by the abutments 37 and 38 but offset laterally from this corner and toward the abutment 37. The axis of the conical seats 44 in the insert are perpendicular to the plane of the insert and the platform 36. Thus, as the screw is tightened to draw the head 43 into the outer seat 44 (FIG. 10), the conical surface of the head cams the insert edgewise toward the abutment corner. To allow full seating of the screw head, the shank of the screw is weak enough to bend as shown in FIG. 10 and force the trailing side edge 18 or 19 and the flat 27 at the inner end of the insert to come into abutment with both of the corner walls 37, 38 of the insert pocket 9 and thus locate the insert in a precise position relative to the cutter body. Preferably, the trailing abutment 37 of each blade slot is formed by the exposed edge of a flat plate 48 in front of a back wall 49 of the blade slot and secured to the cutter body by a tack weld 50 preferably located at the axially facing end of the plate and a second weld 51 at the peripheral edge and inner end of the plate.

In accordance with the present invention, the other abutment 38 for the insert is one edge of a flat plate 52 of polygonal shape, square in the present instance, clamped by a center screw 53 against an extension of the platform 36 with an opposite edge of the polygon abutting a wall 54 formed on the cutter body and upstanding from the inner end of the platform. The wall 37 and the adjacent wall 54 form a corner into which the abutment plate 52 is crowded in the final tightening of a screw 53 which extends through a center hole 56 in the plate and threads into an inclined hole 57 (FIG. 11) in the cutter body. As before, the tightening is effected by a tool entered in a socket 55a in the screw head. Such edgewise crowding of the abutment plate is effected as a conical head 55 on the screw becomes fully seated in a recess 58 at the end of the plate hole 56. Because the axis of the hole 57 is inclined relative to the axis of the hole 56, the screw shank bends as shown in FIG. 11 to accommodate such full seating of the screw head.

The plate 52 is thus adapted for indexing about the axis of the screw hole 57 in the same manner as the insert 15. Thus, if the abutment 38 is damaged in service use, it may easily be renewed in precisely the same location simply by loosening the screw 53 and turning the polygon to present a new edge for use as the abutment, the opposite edge being forced against the wall 54 when the screw is retightened and its shank bent to allow full seating of the screw head 55 in the seat 58.

The inserts 15 constructed as above describe may, by forming the platforms 36 and the abutments 37 and 38 in the proper positions shown relative to the cutter axis 11, locate one of the main cutting edges, for example 23 as shown in FIGS. 1, 9 and 10, and the associated finishing edge 32 slightly beyond and outwardly from the corresponding edges of the platform (see FIG. 10) with the active main cutting edge disposed at the desired bevel angle $b$ (FIGS. 1 and 12) relative to the plane of rotation of the cutter body and with the plane of the cutting face 23a of this edge offset a distance $a$ ahead of a parallel radius of the body as shown in FIG. 8. Thus, this active cutting face is disposed at an apparent negative rake angle but, as described in U.S. Pat. No. 2,186,417 and because of the bevel angle $b$, the active main cutting edges act with positive rake and shear for the reasons fully disclosed in the patent. As a result, the chips removed by the successive main cutting edges curl outwardly as illustrated in FIG. 9 of the aforesaid patent.

Also, as fully described in the patent, the apparent rake and shear angles for each main cutting edge 23 to 26, when disposed in active position by indexing of the insert, is correlated with the desired bevel angle $b$, the work material, and the cutting material of the insert so that the rake and shear angles at which the main cutting edge acts is, by virtue of the bevel, of positive sign and of magnitudes best suited for most efficient cutting of the work material with the selected cutting material of the insert. Since each of the four cutting edges of the insert is disposed in precisely the same position relative to the cutter body when indexed into active position, the same cutting action obtains after each of the four changes above described in the position of the insert.

To renew the main cutting edge, the screw 41 is removed and the blade turned a half revolution thus disposing the second cutting edge 24 in active position, the edge 32 adjacent the flat 27 then being disposed in the clean-up position. To bring the main cutting edge 25 into active position, the screw 41 is removed, the insert inverted, and replaced on the platform with the edge 25 projecting beyond the leading edge 36 of the platform in active cutting position. The area 25a of the edge face 19 is thus exposed to serve as the cutting face for the new active cutting edge. The fourth cutting edge 26 is brought into active position by turning the insert end for end to dispose the edge 29 of the clearance face 21 in the clean-up position. After each indexing of the insert to bring a new main cutting edge and the corresponding clean-up edge into active positions, the screw is tightened down to force the insert edgewise against the corner abutments 37 and 38 and locate the insert and its active cutting edges in precisely the same position in each of the four positions into which the insert may be indexed.

All of the main and clean-up edges of the insert above described may be sharpened without changing the width or length of the insert. The clean-up edges 29, 32 are renewed simply by grinding off the trapezoidal clearance faces 21 and 22 which involves some narrowing of the end flats 27, 28 but does not change the overall length of the insert. In the case of the main cutting edges 23 to 26, only the adjacent areas 23a to 26a of the edge faces 18 and 19 are ground down as shown in FIG. 4 thus leaving a flat 60 extending along the side edge of the insert and between these cutting faces. This flat is disposed in the original plane of the edge 18 or 19 so that after grinding to sharpen the cutting edges on opposite edges of the block, the original width of the latter is maintained. Preferably, the flats 60 have parallel side edges and extend diagonally across the side edge of the insert so that their ends 61 are alined with and intersect the ends of the end flats 27 and 28 as shown in FIG. 4.

It will be apparent that because both the main and clean-up edges of the inserts incorporating the present invention may be sharpened without changing either the length or width of the insert, location of the main and clean-up edges in precisely the same location in all four of the indexed positions of the insert is achieved while preserving the ability of the screw 41 to bend slightly and crowd the insert edgewise against the abutments 37, 38. As a result, all of the four sets of main and finishing cutting edges of each insert 15 may be sharpened repeatedly for reuse.

In the event that the cutter as above described is wrecked accidentally in service use, the inserts 15 and the abutment plates 48 and 52 are the parts most likely to be broken or damaged. The plate 48 can easily be removed by breaking the tack welds 50, 51 and a new plate substituted and welded in proper position in the blade slot. After loosening the screw 53, the inner abutment plate 52 may be indexed to present a new side 38 in active position. Thus, the cutter usually can be repaired easily and cheaply.

The inserts constructed as above described may be adapted for more positive rake angles or for use in cutters in which the main cutting edges are not disposed at bevel angles as above described. For these purposes, the insert, indicated at 68 in FIGS. 6 and 7, is constructed with four main cutting edges 63 to 66 having cutting faces 63a to 66a disposed at acute angles relative to the clearance faces 16 and 17 for these edges for imparting the desired positive rake to each cutting edge when indexed into active cutting position. As in the insert 15 first described and to provide clean-up edges and clearance faces for the cutting edges 63 and 64, the ends of the insert are formed with clearance faces 21 and 22 separated by abutment flats, one indicated at 27, extending diagonally across the insert end. To enable the cutting faces 63a and 64a to be disposed at different angles relative to the plane of the insert, these faces along opposite side edges of the insert are separated by flats 69 which are disposed in parallel planes and cross each other with their opposite ends intersecting the ends of the flats, including 27, at opposite ends of the insert. Thus, and as in the insert 15 first described, the cutting and clearance faces 63a, 64a, 21 and 22 may be ground off to sharpen the four cutting edges 63 to 66 of the modified insert without changing the original length or width of the insert. The latter may, after repeated sharpenings, be crowded into its original and precise position in the bending of the fastening screw as it is tightened and becomes fully seated in the conical seat 70 in the hole 71 of the insert.

I claim as my invention:

1. A tool holder for an indexable insert of cutting material having a plurality of cutting edges spaced from and around an aperture through the insert, a body including a platform rigid therewith supporting said insert, angularly related abutments upstanding from the platform and defining a corner into which said insert may be pressed edgewise to locate one of said edges in cutting position, one of said abutments being one of a plurality of edges of a plate secured to said platform and indexable about a central axis to present different ones of its edges selectively in position to serve as said one abutment for said insert.

2. A tool holder as defined in claim 1 in which said indexable abutment plate is a polygon supported on an extension of said platform and engaging an upstanding wall spaced from said insert and engageable with a side of the polygon to determine the different indexed positions thereof.

3. A tool holder as defined in claim 2 in which said abutment plate is secured to said body by a screw having a frusto-conical head and extending through a center hole in the plate and into a threaded hole in the platform, the outer end of the axis of said hole being tilted at a small angle toward said wall whereby, upon tightening of the screw, the abutment plate is cammed edgewise against said wall by the screw head engaging a conical seat in the hole of the plate and the screw shank is bent laterally, as permitted by the surrounding clearance, to allow the screw head to come into substantially full peripheral surface engagement with said seat.

* * * * *